(12) United States Patent
Pecoraro

(10) Patent No.: US 10,028,500 B2
(45) Date of Patent: Jul. 24, 2018

(54) TRAP FOR CATCHING ANIMALS, IN PARTICULAR MURIDAE

(71) Applicant: Thomas Pecoraro, Alpignano (IT)

(72) Inventor: Thomas Pecoraro, Alpignano (IT)

(73) Assignee: Thomas Pecoraro (IT)

( * ) Notice: Subject to any disclaimer, the term of this patent is extended or adjusted under 35 U.S.C. 154(b) by 417 days.

(21) Appl. No.: 14/896,948

(22) PCT Filed: Jun. 17, 2014

(86) PCT No.: PCT/IB2014/062301
§ 371 (c)(1),
(2) Date: Dec. 9, 2015

(87) PCT Pub. No.: WO2014/203166
PCT Pub. Date: Dec. 24, 2014

(65) Prior Publication Data
US 2016/0143262 A1 May 26, 2016

(30) Foreign Application Priority Data

Jun. 17, 2013 (IT) .............................. TO2013A0497

(51) Int. Cl.
*A01M 23/04* (2006.01)
*A01M 23/02* (2006.01)
(Continued)

(52) U.S. Cl.
CPC ............ *A01M 23/04* (2013.01); *A01M 23/12* (2013.01); *E01F 13/08* (2013.01)

(58) Field of Classification Search
CPC ....... A01M 23/04; A01M 23/12; A01M 23/14
(Continued)

(56) References Cited

U.S. PATENT DOCUMENTS

| 284,759 | A | * | 9/1883 | Reed | ...................... | A01M 23/04 |
| | | | | | | 43/69 |
| 666,233 | A | * | 1/1901 | Lindemann | ........... | A01M 23/04 |
| | | | | | | 43/67 |

(Continued)

FOREIGN PATENT DOCUMENTS

| EP | 0638233 | 2/1995 |
| RU | 2053670 | 2/1996 |
| RU | 2316962 | 2/2008 |

OTHER PUBLICATIONS

Corresponding International Search Report and Written Opinion for PCT/IB2014/062301 dated Nov. 6, 2014. WO.

(Continued)

*Primary Examiner* — Marc Burgess
(74) *Attorney, Agent, or Firm* — The Belles Group, P.C.

(57) ABSTRACT

A trap for catching animals, in particular muridae, is provided with a tank and a passageway, which extends above the tank from an entry and has, at the end, a container for a bait; the floor of the passageway is defined by a gangway, which opens to let an animal fall into the tank and is provided with two trapdoors hinged to one another; the first of said trapdoors is hinged about a horizontal axis, so as to tilt from a substantially horizontal position during the opening of the gangway, and has a counterweight to reclose the gangway; the gangway has an attach device which connects the second trapdoor to a fixed retaining device, so as to support the first trapdoor in its substantially horizontal position even when the first trapdoor is subject to a weight; the attach device is releasable when the weight rests on the second trapdoor.

10 Claims, 4 Drawing Sheets

(51) Int. Cl.
*A01M 23/12* (2006.01)
*E01F 13/08* (2006.01)

(58) Field of Classification Search
USPC .......... 43/62, 69–73; 49/33, 104, 127; 14/53
See application file for complete search history.

(56) References Cited

U.S. PATENT DOCUMENTS

| | | | | |
|---|---|---|---|---|
| 1,096,387 A * | 5/1914 | Pezzolo | ................ | A01M 23/04 |
| | | | | 43/69 |
| 1,464,358 A * | 8/1923 | Gnoinsky | ............. | A01M 23/04 |
| | | | | 43/70 |
| 1,668,367 A | 5/1928 | Hentschel | | |
| 2,564,134 A * | 8/1951 | Streed | ................... | A01M 23/04 |
| | | | | 43/70 |
| 2,608,021 A * | 8/1952 | McKim | ................. | A01M 23/04 |
| | | | | 43/70 |
| 2,643,010 A * | 6/1953 | Hott | .................... | B65G 69/006 |
| | | | | 14/69.5 |
| 3,085,362 A * | 4/1963 | Sauber | ................. | A01M 23/04 |
| | | | | 43/69 |
| 4,154,016 A * | 5/1979 | Reyes | ................... | A01M 23/12 |
| | | | | 43/69 |
| 5,471,781 A * | 12/1995 | Vine | ..................... | A01M 23/04 |
| | | | | 43/69 |
| 2010/0257772 A1 | 10/2010 | Uhlik | | |
| 2014/0352199 A1* | 12/2014 | Matney | ................. | A01M 23/04 |
| | | | | 43/61 |

OTHER PUBLICATIONS

Decision to Grant and Search Report for Corresponding RU Application No. 2016100985 dated May 30, 2018.

* cited by examiner

TRAP FOR CATCHING ANIMALS, IN PARTICULAR MURIDAE

CROSS-REFERENCE TO RELATED PATENT APPLICATIONS

The present application is a U.S. national stage application under 35 U.S.C. § 371 of PCT Application No. PCT/IB2014/062301, filed Jun. 17, 2014, which claims priority to Italian patent application TO2013A000497, filed Jun. 17, 2013, the entireties of which are incorporated herein by reference.

TECHNICAL FIELD

The present invention relates to a trap for catching animals, in particular muridae, such as mice and rats.

BACKGROUND ART

From the Italian utility model TO2011U000044 is known a trap provided with a tank containing a liquid, a bait and a horizontal platform, which is arranged above the tank and is formed by two trapdoors. Said trapdoors can tilt about respective horizontal axes due to the weight of a mouse, when the latter gets onto the platform while searching for the bait. In this way, the mouse slides on the tilted trapdoors and falls into the tank below, where it dies by drowning.

The trapdoors, after the catch of the mouse, return to their original horizontal position, respectively because of a counterweight and a spring. In this way, a relatively large number of mice can be caught before having to empty and refill the tank again.

In the case of rats, the traps of the above described kind are not always able to catch the animal, because the latter can sometimes recognize when the first trapdoor starts to tilt, and then identifies the danger. Therefore, the rat turns back to the trap entry without falling into the tank below and can release pheromones indicative of said danger, so that further possible catches are compromised.

Furthermore, in the case of animals of large dimensions, it is appropriate to manufacture a relatively long trapdoor, having regard to the normal size of the animal able to unbalance the trapdoor, but in this way the trap becomes very cumbersome.

On the other hand, in the case of small sized mice, their weight is sometimes not sufficient to tilt the trapdoors, for example because of friction due to moisture, rust, dirt that may accumulate between the trapdoors and the fixed structure of the trap. In these cases, the mice can eat the bait without being caught, so that the trap should be checked periodically to verify if the bait must be reintegrated inside the trap, and therefore unwanted costs and maintenance time are caused.

DISCLOSURE OF INVENTION

Purpose of the present invention is to provide a trap for catching animals, in particular muridae, which allows to solve in a simple and economic way the above problems and, in particular, allows to obtain a high catch probability without the need to do maintenance on the trap itself.

According to the present invention, a trap for catching animals, in particular muridae, as defined by claim 1 is provided.

BRIEF DESCRIPTION OF THE DRAWINGS

The invention will now be described with reference to the accompanying drawings, which illustrate a non-limiting embodiment, wherein.

BEST MODE FOR CARRYING OUT THE INVENTION

Figure 1:
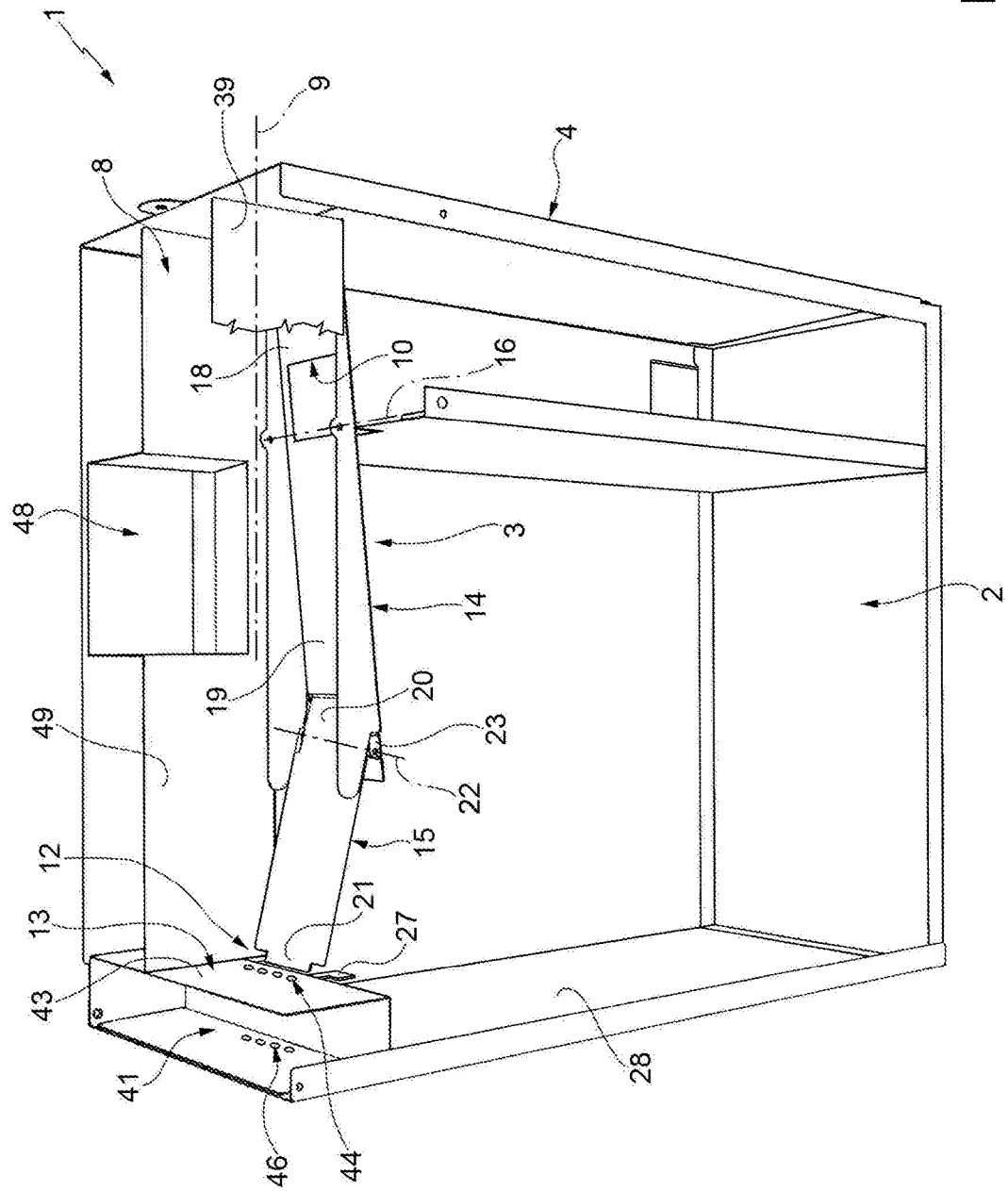
FIG. 1 is a perspective view showing, with parts removed for clarity, a preferred embodiment of the trap for catching animals, in particular muridae according to the present invention.

In FIG. 1, with 1 is shown a trap for catching animals, in particular for catching mice or rats.

The trap 1 comprises a lower tank 2 and an upper gangway or platform 3 arranged in a casing 4 (partially shown). The tank 2 is large enough to contain a group of muridae that can be caught one after the other.

Preferably, the tank 2 contains a liquid (not shown), which causes the drowning of the caught muridae, with preservative agents acting to avoid the decay of such muridae. Advantageously, the tank 2 can be removed from the casing 4 in a not shown manner, in order to change the fluid and remove the muridae killed by drowning. Alternatively, the trap 1 is of the "disposable" type.

The gangway 3 defines the floor of a passageway 8, which extends along a longitudinal direction 9 and is relatively narrow, so as to let pass a single murid at a time along the direction 9 and prevent the murid to turn around to go back, once in the passageway 8.

The passageway 8 is defined by a blind alley that starts from an entry 10 and terminates in an end area 12, in which a container 13 for bait, described more in detail below is arranged.

The gangway 3 is movable from a closed configuration to an open configuration (not shown) due to the weight of the murid, so as to allow it to fall by gravity into the tank 2. The gangway 3 is constituted by two trapdoors 14,15 defined by respective panels or walls, arranged in positions that are substantially aligned along the direction 9.

The trapdoor 14 is the first, when starting from the entry 10, and is rotatable about a fixed horizontal axis 16, perpendicular to the direction 9, as it is coupled to the housing 4 by a hinge.

Preferably, the trapdoor 14 is defined by a rocker lever, which comprises two portions 18,19 which are diametrically opposed with respect to the axis 16. The portion 18 is directed towards the entry 10 and is relatively heavy, for example because it comprises a counterweight (visible in the variant of FIGS. 4 and 5), therefore the center of gravity of the trapdoor 14 is moved towards the entry 10 with respect to axis 16. Thanks to its own weight, in rest conditions (i.e. without the presence of muridae on the gangway 3) the portion 18 tends automatically to bring and maintain the gangway 3 into the closed configuration. An end of stroke shoulder (not shown) is provided to stop the downward rotation of the portion 18, in a substantially horizontal position which corresponds to said closed configuration.

When the gangway 3 instead opens, the trapdoor 14 tilts with the portion 19 facing downwards, so as to drop the murid into the tank 2. Possibly, also the portion 19 could be provided with an additional weight, for example attached to the lower face by means of a magnet, so as to better calibrate the opening of the gangway 3 as a function of the weight or the size of the animals to be caught.

According to a preferred aspect of the present invention, the entry 10 is defined by an opening made directly through the portion 18, so as to reduce the longitudinal dimensions of the casing 4 at equal length of the gangway 3.

Regarding the trapdoor 15, the latter ends with a portion 20 which is coupled to the portion 19, for example by a hinge 23, so as to rotate about an axis 22 parallel to the axis 16 with respect to the trapdoor 14.

Figure 2:
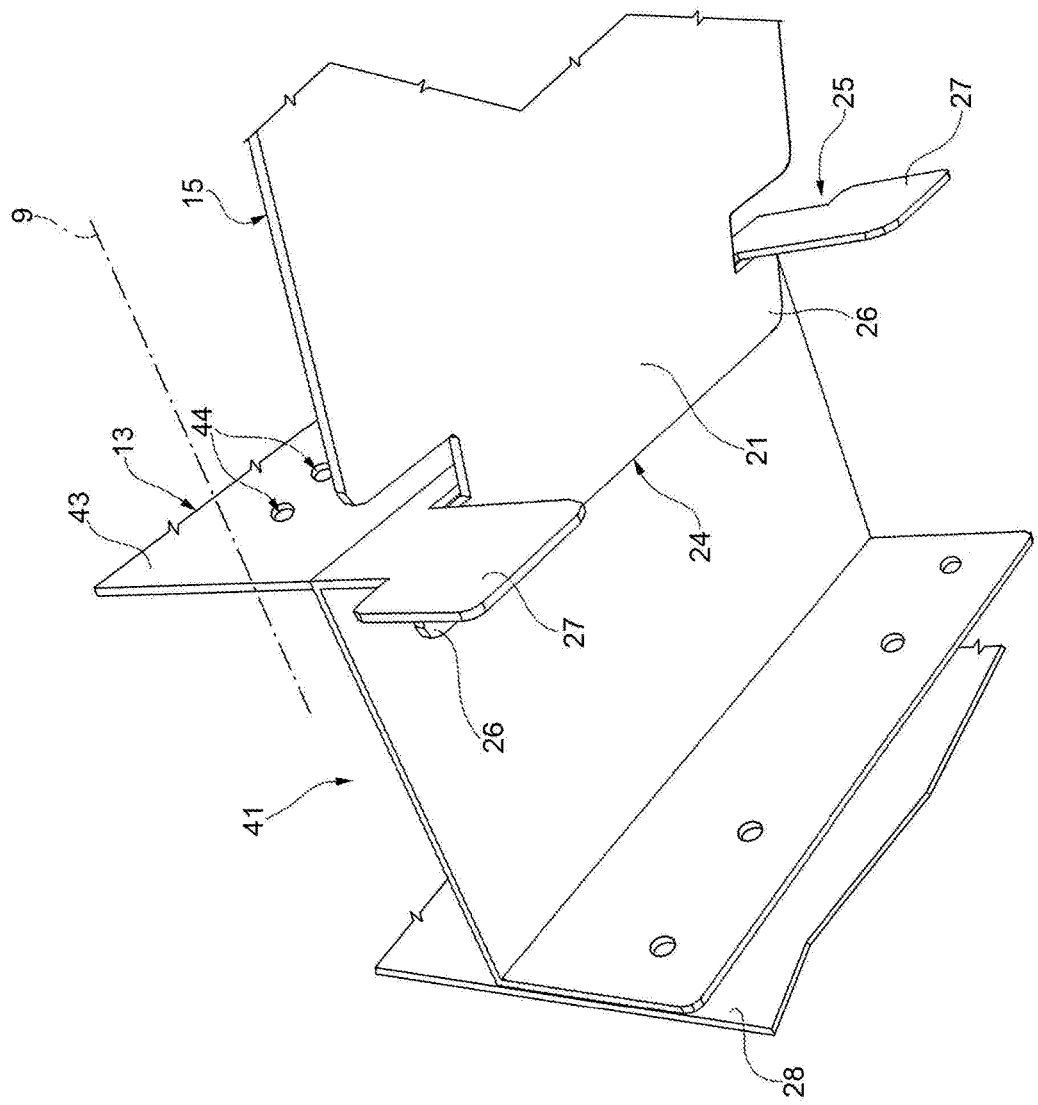
FIGS. 2 and 3 show, in enlarged scale, two details of FIG. 1, according to a perspective view from the bottom and a side view, respectively.

As shown in FIG. 2, at the opposite end with respect to axis 16 and to the portion 20, the trapdoor 15 comprises a portion 21 which supports an attach device 24, configured to couple or engage a retaining device 25, fixed with respect to the casing 4 and/or to the container 13, when the gangway 3 is arranged in the closed configuration. In particular, the attach device 24 is defined by two teeth or hooks 26, which project from the portion 21 in opposite directions parallel to axis 22. Meanwhile, the retaining device 25 is defined by two tongues 27, which are fixed, protrude downwards, are spaced apart from each other in a direction parallel to the axes 16 and 22 so as to leave a gap to accommodate the portion 21 with clearance when the gangway 3 is arranged in the closed configuration, and are spaced longitudinally from a rear vertical wall 28 of the housing 4 so as to leave a gap for the insertion of the teeth 26 when the gangway 3 closes. In the closed configuration, in fact, the teeth 26 rest onto a rear surface of the tongues 27, which faces the wall 28.

The coupling between the teeth 26 and the rear surface of the tongues 27 defines a hooking, configured so as to retain the gangway 3 into the closed configuration when the murid arrives on the portion 19. Indeed, thanks to the constraint defined by the hinge 23, when a murid is arranged on the portion 19, part of its weight is transferred to the trapdoor 15, which exerts a direct drive from the portion 19 to the tongues 27. This traction corresponds to a substantially longitudinal forcing of the teeth 26 against the rear surface of the tongues 27, and this forcing causes a jamming in the vertical direction, which prevents the teeth 26 from lowering.

As shown in FIG. 1, in the closed configuration the trapdoor 15 is slightly inclined upwards (going from portion 20 to portion 21), for example with an angle of about 10°-15° with respect to the horizontal direction and/or with an angle of about 160°-170° with respect to the plane of the trapdoor 14, to better support the trapdoor 14 itself in its substantially horizontal position.

The gangway 3 does not open until the murid rests its own weight directly on the trapdoor 15. In fact, in this condition, the traction exerted by the trapdoor 15, and therefore the forcing of the teeth 26 against the tongues 27 decreases. At the same time, the pressure on the trapdoor 15 tends to rotate the latter downwards with respect to the portion 19. In response to this variation of the forces acting on the trapdoor 15, the teeth 26 automatically disengage from the tongues 27.

After the release of the teeth 26, under the murid weight the trapdoors 14 and 15 rotate together about the axis 16 towards the open configuration, so as to form an empty space between the portion 21 and the wall 28 in which let the murid drop in the tank 2.

After the fall, the weight of the portion 18 is sufficient to automatically return the entire gangway 3 into the closed configuration. The length and angle of the trapdoors 14,15 are set out in the project so as to cause the automatic re-engagement of the teeth 26 behind the tongues 27 at the end of the lifting of the gangway 3.

Figure 3:
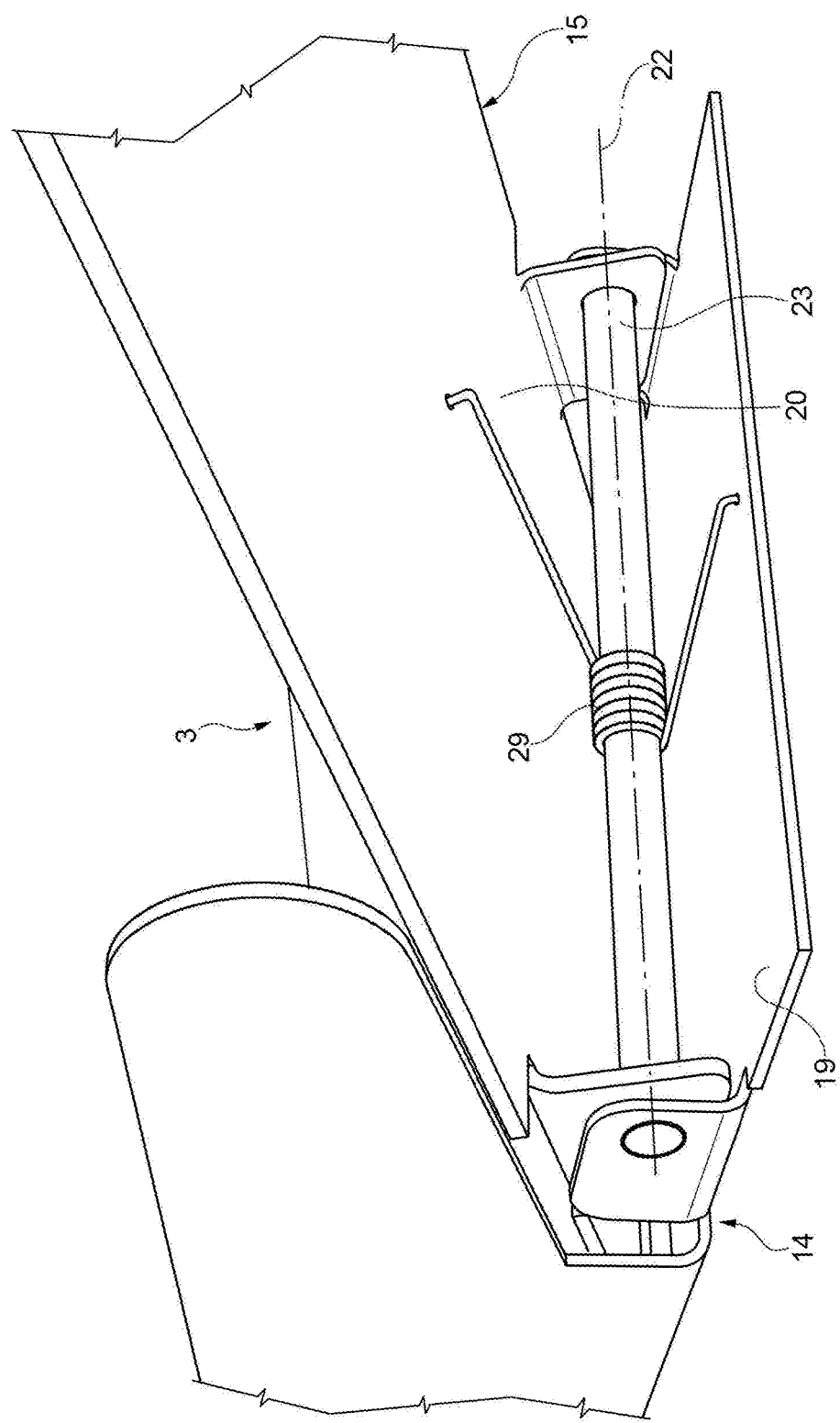

As shown in FIG. 3, preferably the gangway 3 comprises an elastic return element 29 having a position and a preload such as to restore a pre-set angle about the axis 22 between the trapdoors 14,15 when the weight no longer acts on the trapdoor 15, in particular to facilitate the re-engagement. For example, the elastic return element 29 is defined by a metallic helical spring arranged at the hinge 23. The pre-set angle between the trapdoors 14,15 in the rest condition is defined by the rest of the edge of the portion 20 on the upper face of the portion 19.

According to an alternative (not shown) the elastic return element 29 is replaced by a counterweight return element, in an arm of the trapdoor 15, which is made, in this case, as a rocker lever hinged at the axis 22.

Figure 4:
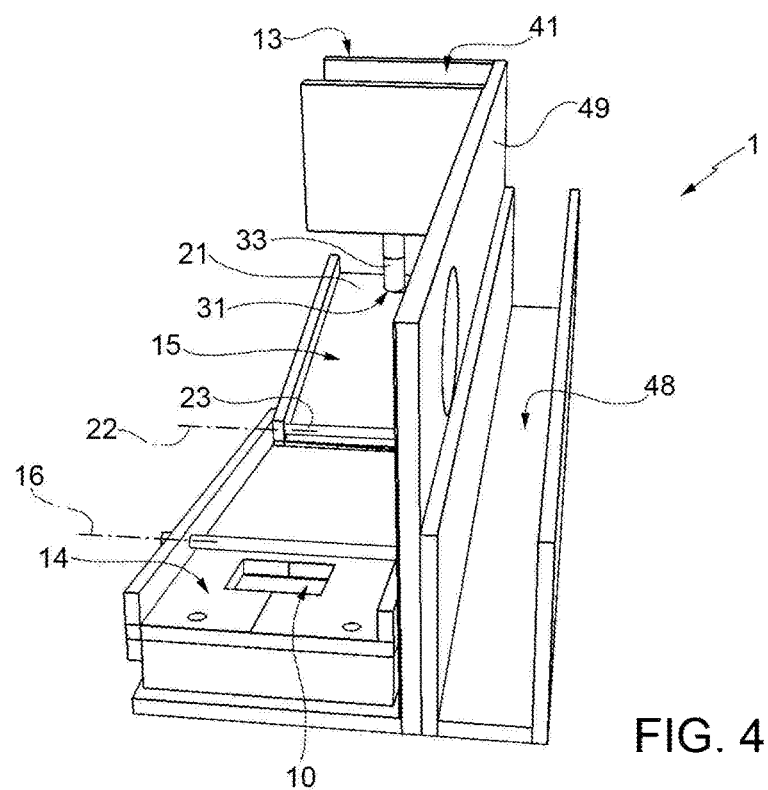
FIGS. 4 and 5 are different perspectives that show, with parts removed for clarity, a variant of the trap of FIG. 1.
Figure 5:
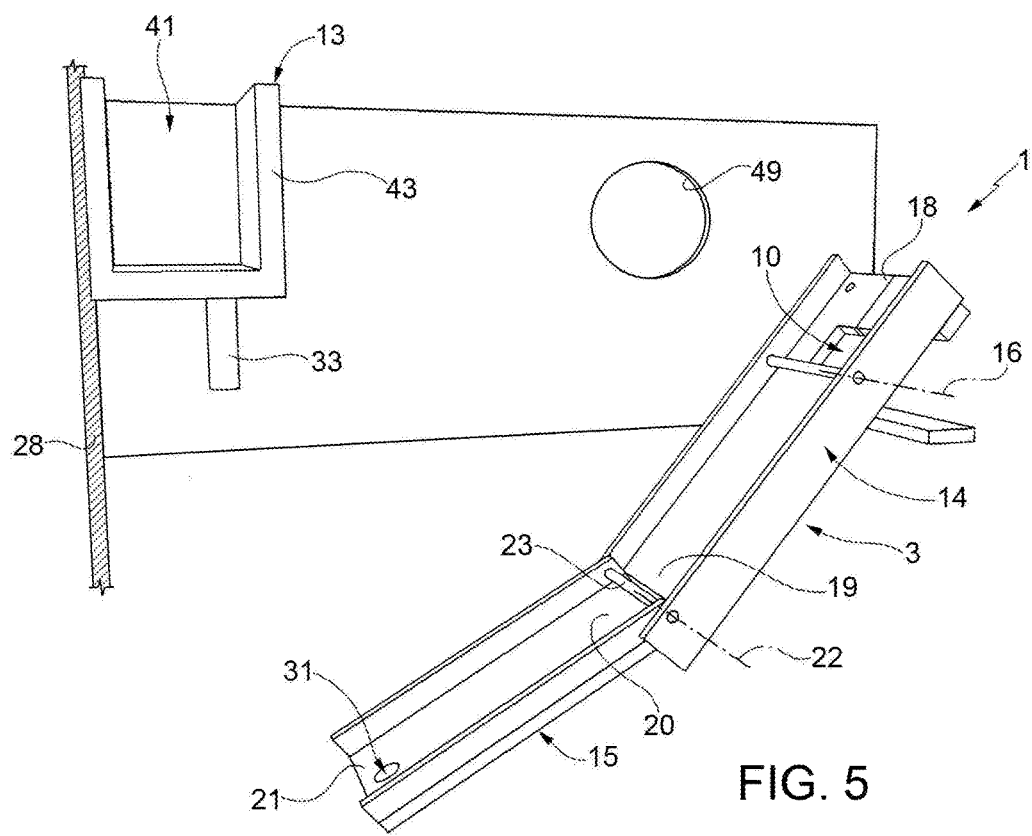

In the variant shown in FIGS. 4 and 5, the trap 1 differs from the solution of FIG. 1 in the fact that the attach device 24 is defined by the edge of an opening 31, made as a through hole in the portion 21. Meanwhile, the retaining device 25 is defined by a fixed pin 33, which is substantially vertical and extends downwards in cantilevered manner, for example from the container 13, in a position longitudinally spaced from the wall 28, so as to leave a gap for the insertion of the end edge of the portion 21 during the lifting of the gangway 3.

As mentioned above and as shown in the attached figures, the container 13 is arranged in a fixed position in front of the wall 28, and has a housing 41 which, in use, houses the bait. According to a preferred aspect of the present invention, the container 13 comprises a shield 43, which separates the housing 41 from the end 12 of the passageway 8 and prevents muridae access to the bait when the platform 3 remains in its closed configuration, in cases where the weight of the murid is not sufficient to open the gangway 3 and/or there is excessive friction in the movements of the gangway 3.

The shield 43 is defined by a wall provided with holes 44 which allow muridae, however, to perceive the presence of the bait when entering the passageway 8.

According to a further aspect of the present invention, as seen in FIG. 1, the end area 12 communicates with the outside through the holes 44 and through one or more openings 46, made in the wall 28 and in a rear wall of the container 13.

The openings 46 are aligned with the holes 44 and with the passageway 8 parallel to the direction 9 so as to generate an ultrasound exit that normally muridae emit, so as to provide the impression that the passageway 8 is not a dead end, but with an exit at the end. In this way, the holes 44 and the openings 46 provide indirectly a false signal on the safety of the passageway 8 so as to increase the catch probabilities.

Advantageously, according to a variation (not shown) the holes 44 and the openings 46 are defined by respective nets which replace the wall 43 and the rear wall of the container 13.

According to a further aspect of the present invention, the trap 1 comprises a feed-box 48, defined by an additional housing arranged next to the trapdoor 14. The feed-box 48 is adapted to contain feed for muridae and is accessible without obstacles and permanently, through an opening made in one of the side walls 49 of the passageway 8. In this way, the pack leader (i.e. the older murid, who usually patrols the territory in search of food) and some muridae may enter in the passageway 8, feed from the feed-box 48 and exit after being fed, without arriving to the trapdoor 15 and therefore without causing the opening of the gangway 3. In this way, these first muridae release pheromones that signal to the rest of the murine family the presence of "safe" food. Once feed is in the feed-box 48, the muridae perceive that there is still feed at the end of passageway 8, i.e. the bait of the container 13, so they proceed till the trapdoor 15, but the pressure thereof causes the opening of the gangway 3, and then the catch, as described above.

The presence of the feed-box 48, therefore, it is important to be able to have, in passageway 8, pheromones that signal the presence of "safe" food and then catch the whole murine colony for disinfestation, otherwise the catches could be limited to only one specimen, which would release only pheromones indicative of danger by falling into the tank 2 and therefore would affect the rest of the catches. In particular, the feed-box 48 does not require any manual intervention, for example, to lock or unlock the gangway 3, as it is arranged next to a part of the trapdoor 14 which will not tilt, thanks to the weight of the portion 18 and/or thanks to the coupling of the attach device 24. As indicated above, only after having finished the feed of the feed-box 48 the muridae are tempted in going forward in the passageway 8 to eat from the container 13 and, therefore, to fall into the tank 2.

From the foregoing it is evident that the catch probabilities of muridae are significantly higher compared to the known solutions.

Firstly, the devices 24,25, together with the bond between the trapdoors 14 and 15, allow to keep in a substantially horizontal position the trapdoor 14 even when the portion 19 is subject to the weight of a murid. The murid perceives danger only when it comes to the trapdoor 15 and tilts it, but it is now far from the entry 10, so hardly able to go back and save itself.

Moreover, as explained above, the presence of the openings 46 and/or 48 of the feed-box define false clues that reassure the muridae on the absence of a danger.

At the same time, the trap 1 does not require special maintenance operations. In particular, it is not necessary to replace the bait in the container 13, thanks to the shield 43.

From the above it is, finally, evident that the trap 1 described and illustrated may be subject to modifications and variants which do not depart from the scope of protection of the present invention, as defined in the appended claims.

In particular, the attach device 24 may be defined by two hooks, which protrude upwards from the side edges of the portion 21, while the retaining device 25 could be defined by two pins that protrude in the passageway 8, respectively from the side walls 49.

The vertical restraining action between the devices 24,25 may be defined by a friction coupling or by a magnetic attachment, instead of real hooking: said magnetic attachment may be defined by a permanent magnet or by an electromagnet which is powered by a small battery and is disabled when a murid unintentionally actuates a corresponding switch while crossing the trapdoor 15.

Furthermore, the vertical restraining action between the devices 24,25 may be integrated with a further retaining action, located directly between the trapdoor 14 and the side walls 49.

Alternatively or in combination to the return caused by the weight of the portion 18, one or more springs may be provided so as to act on the trapdoors 14,15 (or on the abovementioned lever mechanism) and bring the gangway 3 into the closed configuration (in this case the portion 18 could also be absent). The preload of these springs, and/or the position of the axis 16 (and thus the lever arm of portion 18) and/or the weight of the portion 18 may be adjustable, in order to calibrate the movement of the trapdoors 14,15.

The tank may be defined by a housing free of liquid and be used for catching animals other than muridae.

Finally, although not intended by the appended claims, the presence of the feed-box 48, the presence of the shield 43, the presence of the openings 46 and the fact of making the entry 10 in the portion 18, define potential innovative elements, which can be employed advantageously also in combination with other types of gangways, for example to gangways having a single trapdoor or gangways having two trapdoors that are unbound one from the other and/or are devoid of the attach device 24.

The invention claimed is:

1. A trap for catching animals, in particular muridae, comprising:
    a tank;
    a passageway extending from an entry along a longitudinal direction above said tank;
    a container arranged at an end of said passageway and adapted to contain a bait;
    a gangway movable between a closed configuration, in which it defines a floor of said passageway, and an open configuration, in which it lets an animal fall from said passageway into said tank, said gangway comprising:
        a first trapdoor hinged about a first rotation axis, wherein said first rotation axis is fixed, horizontal and orthogonal to said longitudinal direction, so as to rotate between a substantially horizontal position, corresponding to the closed configuration, and a tilted position, corresponding to the open configuration;
        a first return element exerting an action to bring and keep said gangway into the closed configuration;
        a second trapdoor, which is arranged after said first trapdoor along said longitudinal direction, said second trap door comprising a first end portion and a second end portion which are opposite to each other;
    said gangway further comprising:
        a hinge connecting said first end of said second trapdoor to said first trapdoor rotatably about a second rotation axis parallel and spaced apart with respect to said first rotation axis so as to transfer, to said second trapdoor, downward forces due to a weight which rests, in use, on said first trapdoor; and
        an attach device connecting said second end of said second trapdoor to a fixed retaining device so as to support said first trapdoor in its substantially horizontal position despite said weight, said attach device being releasable in response to said weight resting on said second trapdoor.

2. The trap according to claim 1, wherein said second trapdoor has a flat upper surface which, in an inoperative condition, is inclined upwards, going from said first end portion towards said second end portion.

3. The trap according to claim 1, wherein said gangway comprises a second return element exerting an action to have, in an inoperative condition, a pre-set angle about said rotation axis between said first and second trapdoor.

4. The trap according to claim 3, wherein said second return element comprises a spring.

5. The trap according to claim 1, wherein said fixed retaining device comprises at least one element that protrudes downwards.

6. The trap according to claim 5, wherein said attach device comprises an edge of an opening formed in said second trapdoor.

7. The trap according to claim 1, wherein said first trapdoor comprises a rocker lever comprising a first and a second portion which are diametrically opposite with respect to said first rotation axis, said entry comprising an opening formed in said first portion.

8. The trap according to claim 1, further comprising a feed-box, adapted to contain feed, accessible from said passageway and arranged beside a portion of the first trapdoor.

9. The trap according to claim 1, wherein said container has a housing for said bait and comprises a shield, which separates said passageway from said housing, so as to make said bait inaccessible, and has at least one hole.

10. The trap according to claim 1, wherein, at said container, said passageway communicates with the outside environment through at least one opening, which is aligned with said passageway along said longitudinal direction.

* * * * *